US007283888B2

(12) United States Patent
Evans et al.

(10) Patent No.: US 7,283,888 B2
(45) Date of Patent: Oct. 16, 2007

(54) METHOD AND SYSTEM FOR CONTROLLING A MACHINE TOOL WITH DIRECT TRANSFER OF MACHINING DATA

(75) Inventors: Mark S. Evans, Orem, UT (US); Walter Edward Red, Provo, UT (US); Charles Gregory Jensen, Provo, UT (US); C. Porter Bassett, Orem, UT (US); Corey Lynn McBride, Lindon, UT (US); Jonathan Edward Bosley, Tucson, AZ (US); Girish C. Ghimire, Hillsboro, OR (US)

(73) Assignee: Brigham Young University, Provo, UT (US)

( * ) Notice: Subject to any disclaimer, the term of this patent is extended or adjusted under 35 U.S.C. 154(b) by 333 days.

(21) Appl. No.: 10/276,361

(22) PCT Filed: May 10, 2001

(86) PCT No.: PCT/US01/15051

§ 371 (c)(1),
(2), (4) Date: Jun. 5, 2003

(87) PCT Pub. No.: WO01/88647

PCT Pub. Date: Nov. 22, 2001

(65) Prior Publication Data

US 2004/0024472 A1 Feb. 5, 2004
US 2006/0095142 A9 May 4, 2006

Related U.S. Application Data

(60) Provisional application No. 60/204,609, filed on May 16, 2000.

(51) Int. Cl.
*G05B 19/18* (2006.01)
*G05B 19/42* (2006.01)
*G05B 19/04* (2006.01)
*G06F 19/00* (2006.01)
*G06F 9/44* (2006.01)
*G06F 3/00* (2006.01)
*G06F 9/46* (2006.01)
*G06F 13/00* (2006.01)
*B25J 9/22* (2006.01)

(52) U.S. Cl. ............................ 700/186; 700/4; 700/61; 700/86; 700/97; 700/181; 700/246; 700/249; 318/568.13; 318/569; 717/108; 717/116; 719/328; 901/6

(58) Field of Classification Search .................... 700/2, 700/4, 61, 95–97, 181, 182, 245–250, 253, 700/264; 318/560, 567, 568.11, 568.13, 318/569, 571, 574, 578; 717/106, 108, 114, 717/116; 719/315, 316, 328; 901/6

See application file for complete search history.

(56) References Cited

U.S. PATENT DOCUMENTS 4,706,002 A 11/1987 Fukuyama (Continued)

FOREIGN PATENT DOCUMENTS

EP 0706103 4/1996
WO WO 98/37467 8/1997

*Primary Examiner*—Crystal J. Barnes
(74) *Attorney, Agent, or Firm*—Madson & Austin (57) ABSTRACT

Method and system for a direct transmission of motion path data (310) from a generating system (204) to a control system (205) for use in controlling a servo-driven machine. For example, a machine tool for machining stock material, and the data generating system includes a computer-aided-design software package (301). Tool paths for directing the tool members of the machine tool can be extracted from a design file opened by the CAD software through the operation interface of the CAD software (302). Alternatively, the design file can be used to specify motion paths rather than end product geometry. The CAD interpreter application extracts the motion path data from the design file, eliminating the need to translate the data into another or intermediate form for controlling the machine tool.

44 Claims, 6 Drawing Sheets

U.S. PATENT DOCUMENTS

| | | |
|---|---|---|
| 5,060,133 A | 10/1991 | Carter, II |
| 5,268,837 A * | 12/1993 | Saylor .......................... 700/61 |
| 5,453,933 A * | 9/1995 | Wright et al. ............... 700/181 |
| 5,485,620 A * | 1/1996 | Sadre et al. ................. 717/162 |
| 5,506,787 A | 4/1996 | Muhlfeld et al. |
| 5,511,147 A * | 4/1996 | Abdel-Malek .............. 700/264 |
| 5,703,782 A | 12/1997 | Dundorf |
| 5,880,956 A * | 3/1999 | Graf ............................. 700/86 |
| 5,907,494 A | 5/1999 | Dangelo et al. |
| 5,950,006 A | 9/1999 | Crater et al. |
| 6,022,132 A * | 2/2000 | Schulz ........................ 700/186 |
| 6,101,425 A | 8/2000 | Govindaraj et al. |
| 6,112,133 A | 8/2000 | Fishmann |
| 6,144,895 A | 11/2000 | Govindaraj et al. |
| 6,278,079 B1 * | 8/2001 | McIntyre et al. ...... 219/121.67 |
| 6,341,246 B1 * | 1/2002 | Gerstenberger et al. .... 700/245 |
| 6,345,212 B1 * | 2/2002 | Nourse ....................... 700/182 |
| 6,445,973 B1 | 9/2002 | Sagasaki et al. |
| 6,542,937 B1 * | 4/2003 | Kask et al. .................. 719/328 |
| 6,823,342 B2 * | 11/2004 | Wallen et al. .............. 707/102 |
| 6,895,299 B2 * | 5/2005 | Red et al. ................... 700/186 |
| 6,934,601 B2 * | 8/2005 | Hirai et al. ................. 700/194 |
| 2003/0120375 A1 * | 6/2003 | Arai et al. .................. 700/187 |
| 2004/0075809 A1 * | 4/2004 | Wildsmith et al. .......... 351/177 |

* cited by examiner

METHOD AND SYSTEM FOR CONTROLLING A MACHINE TOOL WITH DIRECT TRANSFER OF MACHINING DATA

This application claims the benifit of U.S. Provisional Application No. 60/204,609, filed on May 16, 2000.

FIELD OF THE INVENTION

The present invention relates to the field of digitally interfacing a robot, machine tool or other servo-driven machine with a system for providing the data for controlling that servo-driven machine. The present invention also relates to the field of machining equipment parts from appropriate material with a numerically controlled or computer controlled machine tool that roughs and/or finishes an initial piece of material according to the specifications defining a part to be made. More specifically, the present invention relates to a new paradigm for controlling the operation of such machine tools by directly transferring the machining data defining the part to be made from a CAD/CAM application to the machine controller.

BACKGROUND OF THE INVENTION

There are many machines in modem industry with moving parts that are driven by servo-motors. These machines include industrial robots, coordinate measuring machines, machine tools and the like. These group of machines are referred to generally herein as "servo-driven machines."

Typically, a master system provides data to a servo-controller that, in turn, controls the servo-motors to appropriately operate and move the components of the servo-driven machine. Machines tools are a prominent example of such servo-operated machines with which the present invention is particularly concerned.

When machines are first developed or are produced on a limited basis, parts specific to those machines must be custom made from appropriate material. This is generally accomplished through "machining," a process in which a piece or stock of material is mechanically cut, ground, drilled and finished as necessary to create the desired part. The machines used to transform raw materials into specified parts are referred to hereafter as "machine tools." Modem machine tools are highly sophisticated and precisely controlled so as to create parts according to exacting specifications. Most such modem machine tools are controlled by computers that process precise numerical instructions defining the part to be made.

The first numerically controlled machine tool was a 3-axis milling machine built in 1952. Numbers were used to specify movement of the milling head in a 3-axis system to machine a desired part. However, the machine tool was mechanically set by hand according to the specification numbers as the machining progressed. As electronic technology has subsequently progressed, "numerical control" machine tools have incorporated increasingly sophisticated electronics to automate the machining process. Today, numerically controlled machine tools include computer processors and electronic memory units (RAM and ROM). Thus, today's machine tools are computer controlled and referred to as "computer numerical control machines."

Early computer controlled machines received input from punched tape. The instructions recorded on these tapes were both input/output ("I/O") commands (e.g, turn on/off spindle or coolant, setting default feed rate and speed, etc.) and motion commands (e.g., move to some x y z position in a linear or circular fashion.) The language that these instructions were written in has come to be called M&G code. M&G code can be thought of as analogous to assembly language for personal computers; it is the lowest level of programming for machine tools and is generally accepted by all machine tools regardless of make or model. Even though the first numerically controlled machines were built about fifty years ago, we still program machine tools using this same M&G code language with only minor modifications.

Over the past 50 years dozens of companies have attempted to build the ideal machine tool controller. These controllers have consisted of custom hardware components and highly specialized one-of-a-kind operating systems. Many of these have been proprietary closed systems. While open architecture for the hardware of these control systems may be appearing on the horizon, machine tools of today, for the most part, use technology that is decades old. Where proprietary control is maintained over machine tool hardware controller technologies, programming the machine can only be performed through the M&G code environment.

M&G code uses words, or individual commands, and blocks, or lines in a single file or program. All the commands on one line are read and all are executed simultaneously. In order to create an M&G program, it is necessary to calculate all the geometry for all the tool paths, e.g., the line segments and arcs that the tool tip of the machine tool passes through while machining the desired part. From this geometry, motion and I/O commands are calculated. These commands must then be written in M&G code and the code must be entered into the controller. Originally, the M&G code had to be manually entered into the controller or punched into Mylar or paper tape that was then fed into a reader on the controller. Even today, it is a long and tedious task to write an M&G program to machine a complex part.

In the late 50's and early 60's many new and more flexible programming languages came into existence. Automatically Programmed Tools ("APT") was one of the first of these new languages. Using APT, an engineer defines the geometry of the machine tool, the geometry of the tool tip, and the machining parameters that control the I/O of the machine tool. However, due to the proprietary and inconsistent nature of available machine systems, the commands created using APT must ultimately be translated in the more basic M&G code. APT applications perform calculations to generate a Cutter Location ("CL") file based on the commands in the APT program. The CL file is an ASCII file that contains the geometry of the paths that the tool tip of the machine tool must pass through during the machining process. This CL file is then translated into M&G code using a program called a postprocessor.

In the 60's and 70's, as computers became less expensive and more powerful, more mechanical design was done using Computer-Aided-Design ("CAD") programs. Computer-Aided-Manufacturing ("CAM") programs allow users to use the geometry defined in CAD programs to plan out the tool paths for programming a machine tool. CAD, CAM and CAD/CAM programs are considered herein as belonging to a general class of software packages referred to generally as "design applications." The tool paths defined by a CAM application are exported in the form of CL or APT files, which still must be translated into M&G code before being transferred to the machine controller. This practice is still the standard in use today.

Figure 1:
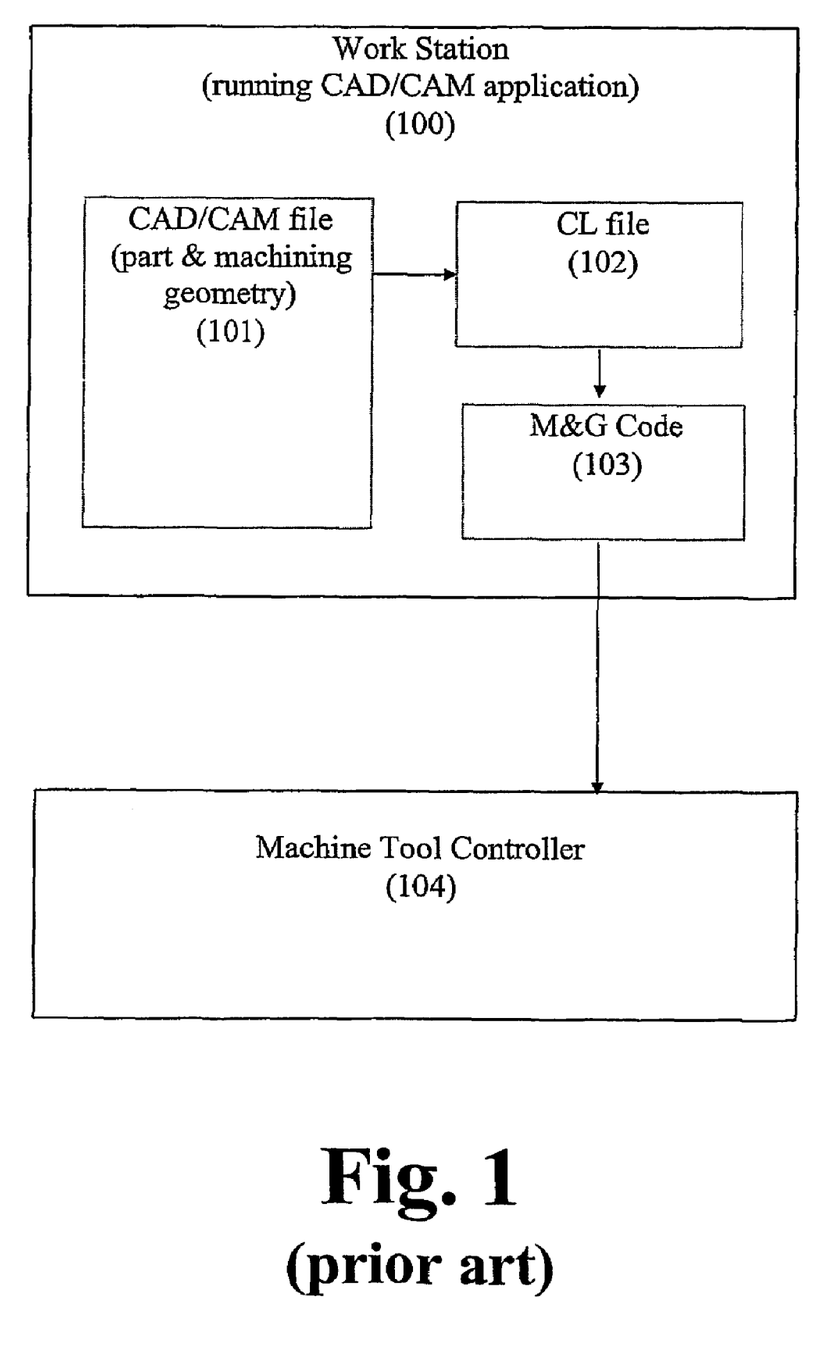
FIG. 1 is a block diagram illustrating the conventional systems and data structures used in programming a machine tool controller.

A typical process of using a CAD/CAM application to program a machine tool is illustrated in FIG. 1. As shown in FIG. 1, the CAD/CAM application is run on a work station (100). Using the CAD/CAM application, a CAD/CAM file (101) is created which specifies the geometry for the both the machine tool and the part to be made. Files, such as file (101) containing design information created by a CAD/CAM or similar software package are referred to herein generally as "design files."

The CAD/CAM application, or perhaps a separate application, then uses the CAD/CAM file to calculate the cutter location data for the machine tool tip throughout the machining process and creates a CL file (102). The CL file (102) is an ASCII file. The CL file (102) can then be translated into M&G code (103), which is also an ASCII file. The translation form CL file (102) to M&G code (103) is typically performed by a post processor. The M&G code (103) is then transmitted to the machine tool controller (104) which uses the code to control the machine tool (not shown) throughout the process of machining the specified part.

Starting with the export of the CL file (102) from the CAD/CAM software, each CL file is uni-directionally associated with the parent CAD/CAM file (101). Thus, any modification to the parent CAD/CAM file (101) will not be reflected in an exported CL file (102) and would require generation of a new "child" ASCII CL file (102), modification always flowing from parent to child. Similarly, modification of a child file (102), perhaps by a machinist preparing the M&G code file, would not effect a modification or correction of the parent design file (101).

As a design evolves, this uni-directional flow of data makes the task of keeping all relevant files current and deleting obsolete files very problematic. Consequently, there is a need in the art for a method and system of better controlling a machine tool that facilitates the modification, updating and management of control files being provided to a machine tool controller.

A further problem arise in the variation of even the "standard" M&G code between machine tool controllers. In reality, M&G codes are not consistent from machine tool to machine tool. Efforts have been made to standardize M&G codes, but have not yet succeeded. This problem arise principally from the fact that the M&G standards do not have the flexibility to implement many of the functions that some advanced process machine tools make available. The manufacturers of these advanced machine tools have, of necessity, extended existing standards using unique new commands to force new machining technologies onto a code architecture not otherwise capable of supporting these technologies.

For example, many modern machine tool controllers are capable of directing the machine tool to machine a true Non-Uniform Rational B-Spline curve ("NURBS"). Even though it is not part of the M&G code standard, these controllers recognize non-standard M&G codes as codes for NURBS.

The effect is that programming interfaces and languages now vary by machine manufacturer and model, even when purporting to be based on standard M&G code. Consequently, there is a need in the art for a method and system that avoids the problems of inconsistent M&G code versions between machine tools of different make and model.

In CL files and M&G code, geometry is represented as a series of points that the tip of the cutting tool passes through in order to manufacture the geometry. These points define the path of the cutting tool. This path is comprised of straight-line segments and circular or helical arcs. Paths that are neither linear nor circular are approximately by discrete points or small line segments. Sculpted and free form surfaces are increasingly used in consumer products. CAD vendors have made great strides in their software to model complex curves, surfaces, and solids, but the tools and techniques used to manufacture them are the same ones that have been in use for decades.

A complex surface may be represented inside the CAD program with a single equation, but may need to be represented as thousands of line segments in the instructions provided to the machine tool controller in order to get the required accuracy. There is no way to avoid this loss in accuracy while using the traditional data flow illustrated in FIG. 1.

As mentioned above, there are some very expensive machine tool controllers that have the ability to handle complex paths such as NURBS. This allows such machine tools to manufacture complex surfaces faster and smoother than with linear interpolation. The problem is in communicating the specification for the desired NURBS to the machine tool controller. In order to communicate with the machine tool controller, the NURBS specified in the CAD/CAM design file (perhaps using a single equation for each curve) must be translated into the line segment geometry used by M&G code. The machine tool controller may then translate the line segment instructions of the M&G code into the NURBS command used by the machine tool (specified perhaps by interpolating a NURBS curve through a series of points). This conversion of a NURBS into line segments and then back into a true NURBS expression results in a needless loss of accuracy in defining the NURBS.

Consequently, there is a further need in the art for a system and method that avoids the needless loss of accuracy associated with transmitting one NURBS representation created by a CAD/CAM application to a possible different NURBS representation used by an advanced machine tool controller through the mediacy of line-segment-based M&G code.

SUMMARY OF THE INVENTION

It is an object of the present invention to meet the above-described needs and others. Specifically, it is an object of the present invention to provide an improved system and method of programming a machine tool controller to machine a specified part based on data generated with a CAD/CAM or other design application. It is a further object of the present invention to provide a system and method of programming a machine tool controller that avoids the problems associated with managing a series of child files that reflect the evolution of the part design in a parent design file.

It is a still further object of the present invention to provide a system and method of programming a machine tool controller that avoids the problems caused by the variation in advanced commands among the various versions of M&G code used in different makes and models of machine tools. And, it is a further object of the present invention to provide a system and method of programming a machine tool controller that avoids needless loss of accuracy in specifying curves, such as NURBS, associated with translating representations of those curves through line segment approximations used in, for example, M&G code.

Additional objects, advantages and novel features of the invention will be set forth in the description which follows or may be learned by those skilled in the art through reading these materials or practicing the invention. The objects and advantages of the invention may be achieved through the means recited in the attached claims.

In summary, the present invention provides for a conceptual integration of the traditional CAD workstation and a machine tool controller. The machine tool controller preferably includes two processors, or two computers each providing a processor. The first processor executes a design application, i.e. a CAD, CAD/CAM or similar software package, that can be used to generate, review or modify a design file. The second processor executes the software required for controlling the machine tool.

The control of the machine tool can be accomplished entirely by the software running on the second processor. This software, which may include several Applications or objects, is generally referred to as "motion control software." No additional hardware architecture is required as part of the machine tool controller.

Motion path data specifies the path or paths along which the tool head or heads of the machine tool must be moved to manufacture the desired product Motion path data can be extracted directly from the design file if the application program interface (API) of the design application, e.g., a CAD/CAM package, is open and available. The motion control software can then use that tool path data to drive the machine tool and produce the specified product.

Where the API of the design application is unavailable, the design application, e.g., a CAD/CAM package, could pass motion path data to the motion control software using an API set of the Direct Machining motion control software. The motion control software can then use the tool path data to drive the machine tool and produce the specified product.

Preferably, the motion path data is passed in the form of a C++ motion object that specifies the position and orientation of the tool head or heads of the machine tool and any point in any tool path. Preferably, the motion object includes three other object: a rates object that determines feed rates and speed rates for control of elements of the servo-driven machine; a velocity profile generator object for controlling velocity transitions in those motion paths; and a path object containing information defining each motion path.

The motion path data extracted from the CAD system will typically be in a Cartesian coordinate system. Consequently, the motion control software translates the Cartesian tool path data into an appropriate reference frame from which servo control signals for driving servo-motors of the machine tool can be generated by a servo controller application.

BRIEF DESCRIPTION OF THE DRAWINGS

The accompanying drawings illustrate the present invention and are a part of the specification. Together with the following description, the drawings demonstrate and explain the principals of the present invention.

DETAILED DESCRIPTION OF THE PREFERRED EMBODIMENTS

The present invention provides a new, open, software architecture for digital control interfaces. As will be recognized by those of skill in the art, this new interface architecture can be utilized in any system in which control data is sent to a servo-controlled machine that is interfaced with a control system.

A preferred application of the digital control interface and accompanying principles of the present invention is to the machine tool controller of a machine tool for making machine parts according to predetermined specifications. For example, the present invention provides a new paradigm in which it is possible to utilize the abilities of existing design applications, such as CAD/CAM packages, and machine tool controllers to more directly and efficiently transfer a CAD-generated design of a part into the instructions necessary to appropriately control the machine tool. The process of the present invention will be referred to as "Direct Machining."

Direct Machining eliminates the need for ASCII files, such as CL files and M&G Code files, that exist external to the CAD design file. Rather, the machine tool controller is enabled to read the original CAD design file and extract therefrom all relevant machining data required to control the machine tool to make the specified product.

Figure 2:
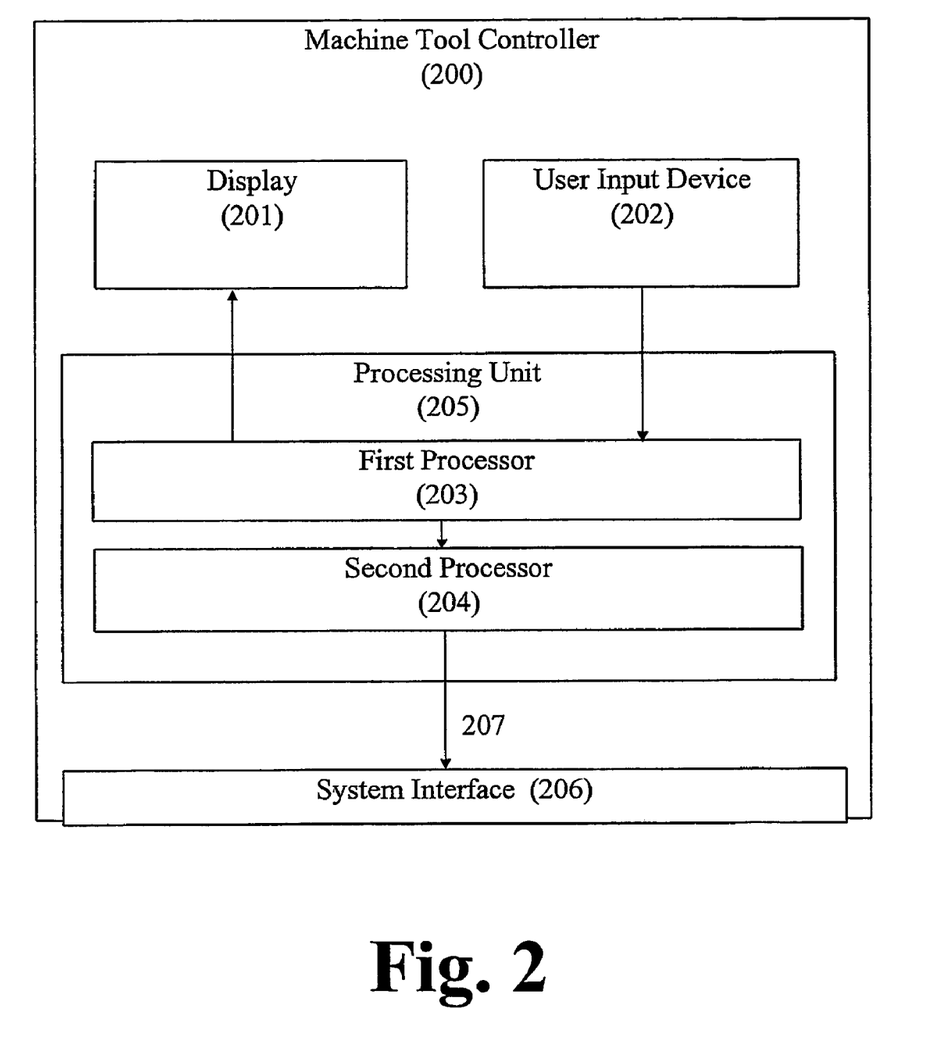
FIG. 2 is a block diagram illustrating a machine tool controller system according to the present invention.

A preferred embodiment of this particular application of the present invention will now be described with reference to the Figures. As shown in FIG. 2, a machine tool controller (200) according to the present invention may incorporate some of the principal features of a conventional CAD workstation (100). Specifically, the controller (200) may include a first processor (203) on which a CAD software package is executed. This processor (205) is connected to both a display device (201), e.g., a cathode ray tube monitor, liquid crystal display or the like, and a user input device (202), e.g., a keyboard and mouse, trackball, joystick or the like. Consequently, a computer aided design can be created or modified on the hardware of the machine tool controller (200) rather than at a separate workstation.

Of course, a design file generated at a separate CAD workstation could also be transmitted to the processor (203) for display, review and/or modification on the hardware (201, 202) of the machine tool controller (200). The CAD file could be transferred to the machine tool controller (200), for example, on a floppy disk or by any other means of file transfer including over a wired or wireless network connection between the workstation and the controller (200).

In the example of FIG. 2, the first processor (203) is part of a processing unit (205) which also contains a second processor (204). Generally speaking, the first processor (203) runs the CAD or CAD/CAM software package or other design application, while the second processor (204) runs the software necessary to use the data generated by the CAD software to control the machine tool accordingly.

The software executing on the second processor (204) is referred to generally as "motion control software" and is a complete system for controlling the machine tool. No additional controller hardware is needed.

A system interface (206) is provided between the machine tool controller (200) and the machine tool (not shown in FIG. 2) so that the software of the second processor (204) can communicate with and control the machine tool. A connection (207) is provided between the second processor (204) and the system interface (206). The system interface (206) will be described in more detail below.

While the dual-processor unit (200) illustrated in FIG. 2 is preferred, the present invention can also be practiced with two separate computer units, e.g., two PC's, each providing a respective first or second processor as described herein. Windows® NT-type processors can be used in implementing the present invention.

In order to best accomplish Direct Machining, it is necessary to have both a CAD/CAM system and a machine controller with known architectures to enable access to their internal functions. For example, to machine the specified part, a mathematical representation of each machine tool path, i.e., motion path data, must be created from the design of the part to be made.

CAD or CAD/CAM packages have an Application Program Interface (API). The API is an interface between the operating system and the design application. The API defines the way in which the design application communicates with the operating system, and the services the operating system makes available to the design application.

Direct Machining will work best if the motion control software controlling the machine tool could access the design application through its API and directly take the tool paths for the machine tool out of the design file opened by the design application Unfortunately, conventional CAD/CAM packages do not seem to have publicly available APTs with the functionality necessary to accomplish this extraction. However, if the API of the design application is available, the best implementation of the present invention might be to simply take the machine tool paths directly from the design file data through the API of the design application. This extraction would preferably be performed by the software running on the second processor (204). These machine tool paths can then be used by the machine controller software of the second processor (204) to control the machine tool to make the specified part.

Where, as is generally the case, the API for a CAD/CAM package is not available, the principles of the present invention can still provide for Direct Machining. In this case, the motion control software will provide an API set that the CAD/CAM package can call to pass tool path information to the Direct Machining Software.

Figure 3:
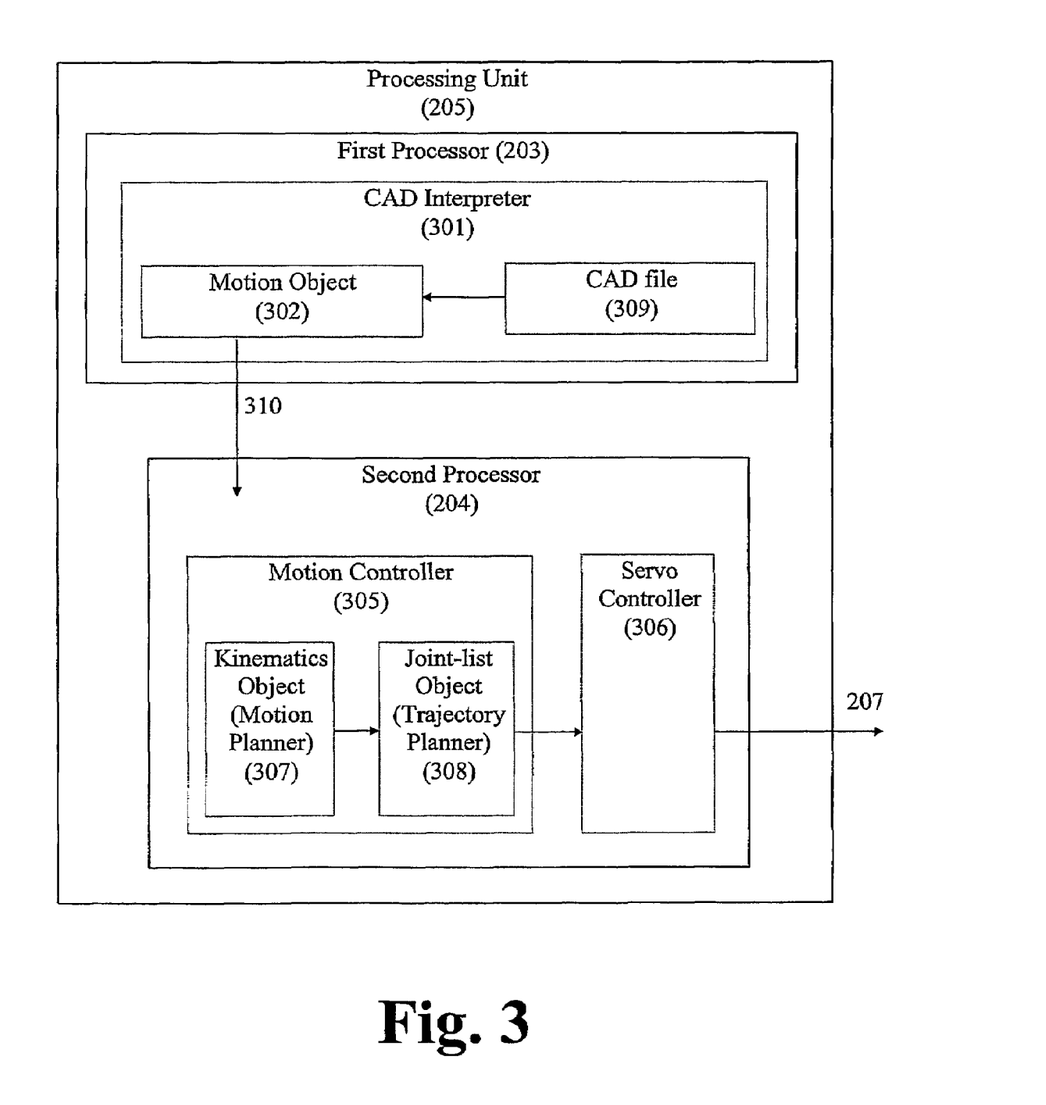
FIG. 3 is a more detailed block diagram of the processing unit shown in FIG. 2.

To understand how tool paths are passed to the controller in the present invention, it is necessary to understand something about the architecture of the software being executed on the first (203) and second (204) processors. As shown in FIG. 3, there are two principal applications running on the dual-processor system of the present invention: the CAD Interpreter (301) and the Motion Controller (305). Consistent with the explanation above, and as shown in FIG. 3, the CAD Interpreter (301) is preferably executed on the first processor (203). While the Motion Controller (305) is preferably executed on the second processor (204).

The CAD Interpreter (301) is considered a design application and is able to understand the design file (309) created with a CAD package and extract therefrom the relevant machining information, i.e., the machine tool paths represented by the data in the design file (309). The CAD Interpreter (301) needs almost no information about the controller or the machine tool that will be controlled to make the specified part. However, it is the CAD Interpreter (301) that provides the motion path data that the Motion Controller (305) will use to guide the tool heads of the machine tool.

As will be described in more detail below, the Motion Controller (305) is an application running on the second processor (204), is part of the motion control software of the present invention and receives the tool path data (310) from the CAD Interpreter (301) on the first processor (203). The Motion Controller (305) is responsible for translating the tool path data (310) from the CAD Interpreter (301) into data that can be used to appropriately control the machine tool to make the specified product. The Motion Controller (305) also determines move tangency. The Motion Controller (305) contains two subsystems that accomplish these tasks.

The motion path data (310) provided by the CAD Interpreter (301) typically specifies tool paths in a Cartesian coordinate system. The Motion Controller (305) first executes a Motion Planner (307) to map the tool path data from Cartesian space to joint-space. Joint-space is a coordinate system which defines the possible paths of the tool head or heads of the machine tool. From the joint-space data, a Trajectory Planner (308) calculates the actuator values required to appropriately move the tool head or heads of the machine tool through the specified paths.

As shown in FIG. 3, the actuator values are then transmitted to a servo-controller application (306) which is also part of the motion control software of the present invention. The servo-controller (306) is responsible for performing the servo-control loops in order for the tool head or heads of the machine tool to move through the specified tool paths that will result in manufacture of the desired part from the stock material on the machine tool.

Preferably, the system of the present invention employs objects written using the C++ computer language. C++ objects are data structures that can have both members (sub data structures or variables) and methods (functions that can be called on the objects) associated with them. Functions can also "ask" an object a question by calling an appropriate function on that object. The "answer" is received through the return value of the function.

C++ objects also have the properties of inheritance and polymorphism. Inheritance describes the ability of an object class to inherit properties from a parent class. As such, any specific members or methods defined for the child (or derived) class, will also have all the members, methods, and properties of the parent class. Consequently, an object of the derived class can be treated as either a member of the child class or as a member of the parent class. Polymorphism allows that all classes derived from the same parent class can have the same interface, so that objects can treat them externally as the parent class. However, when the functions in that interface are called, the behavior of the object can be very different, depending on the object's derived class.

The Motion Controller (305) contains the member objects (307 and 308) that perform the special functions mentioned above. The Kinematics Object (307) transforms Cartesian values to joint values and the Joint-list Object (308) then transforms joint values to actuator values. The Joint-list Object (308) preferably contains a specific joint-actuator object for each joint of the machine tool being controlled. Thus the joint-to-actuator transformation is performed by a separate joint-actuator object for each joint. The actuator positions and rates are then passed to the software servo-controller (306). The Kinematics Object and Joint-actuator Objects that the Motion Controller (305) uses are actually derived from base classes and will be different, based on the type of transformation that they represent (e.g., 3 or 5-axis machine tool for the Kinematics, and geared or ball screw for the Joint-actuator).

The servo-controller application (306) contains pointers to objects that perform tasks like closing the servo-control loops and communicating with the motors. (See FIGS. 4 & 5). As with the Motion Controller (305), the servo-controller application (306) contains objects that are also derived from base classes. For example, the servo-controller contains objects that execute the servo-control loop, but the object will be one of various derived classes based on the control law that it implements (e.g., PID, etc.).

Machining information is preferably sent from the CAD Interpreter (301) to the Motion Controller (305) through a C++ object called a Motion Object (302). After the Motion Controller (305) receives the Motion Object (302) from the CAD Interpreter (301), it gets all necessary tool path information by querying the Motion Object (302). The Motion Object (302) is created by the CAD Interpreter (301) and tells the Motion Controller (305) the position and orientation that the tool needs to be in at any time during movement of the tool head along the tool path. The Motion Processor (305) then utilizes the C++ objects that it contains, as described above, to transform the tool position, orientation, etc., into the actuator values that the servo-controller (306) will use. The servo-controller (306) will then use control laws, which have been stored in the system and are specific to the machine tool being controlled, to calculate the torques to apply to the motors of the machine tool to achieve those values.

Figure 4:
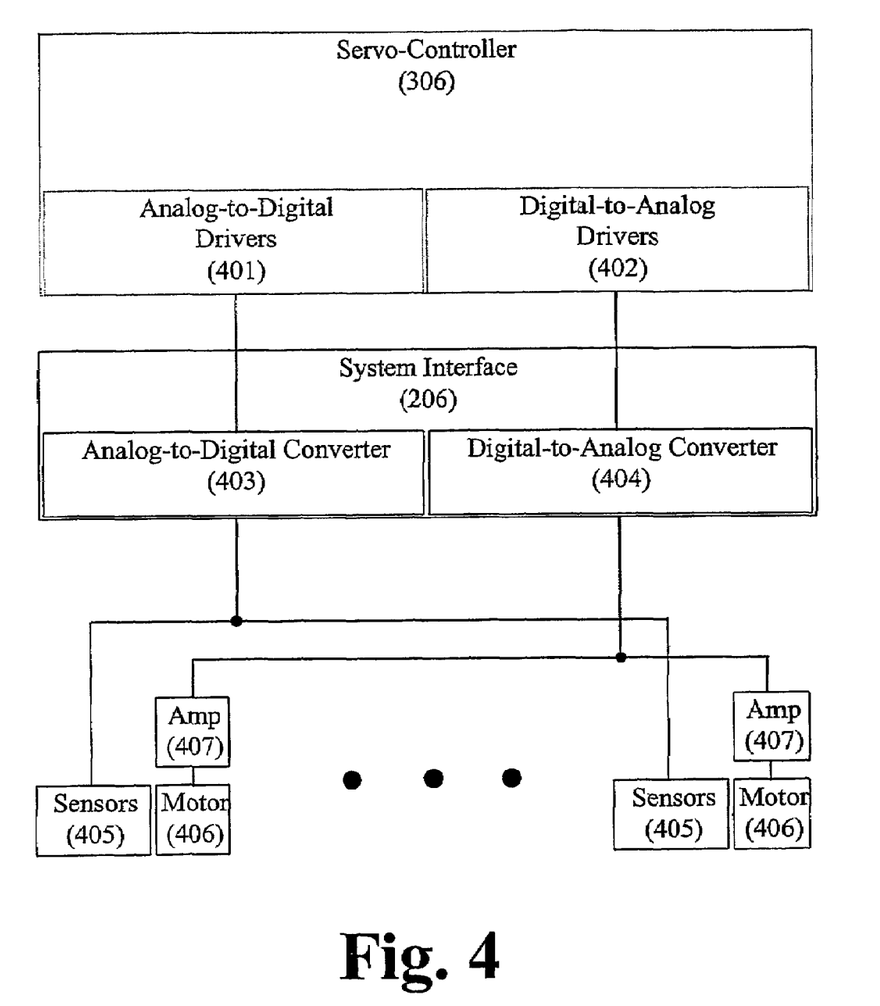
FIG. 4 is a more detailed block diagram of the servo-controller object and system interface shown in FIG. 2, according to a first embodiment.

FIG. 4 illustrates an embodiment of the present invention in which analog motors are used to drive the parts of the machine tool to move the machine head through the desired tool path. In such an embodiment, the servo-controller (306) includes digital-to-analog drivers (402) that communicate digital control signals for the motors (406) to a digital-to-analog converter board (404) in the system interface (206). The analog control signals from the converter board (404) are then amplified (407) and provided to the motors (406). A sensor (405) associated with each motor (406) senses, for example, the actual torque, the position, velocity and acceleration of the motor (405) and provides an analog signal to an analog-to-digital converter board (403) in the system interface (206). The digitized sensor signals are then provided to analog-to-digital drivers (401) of the servo controller (306) to complete the feed-back loop that will allow the servo-controller (306) to drive the motors (406) as desired according to the specified tool paths.

This process can be, and is preferably, implemented entirely as software with no additional hardware required. Thus, closed hardware architectures can be eliminated.

Figure 5:
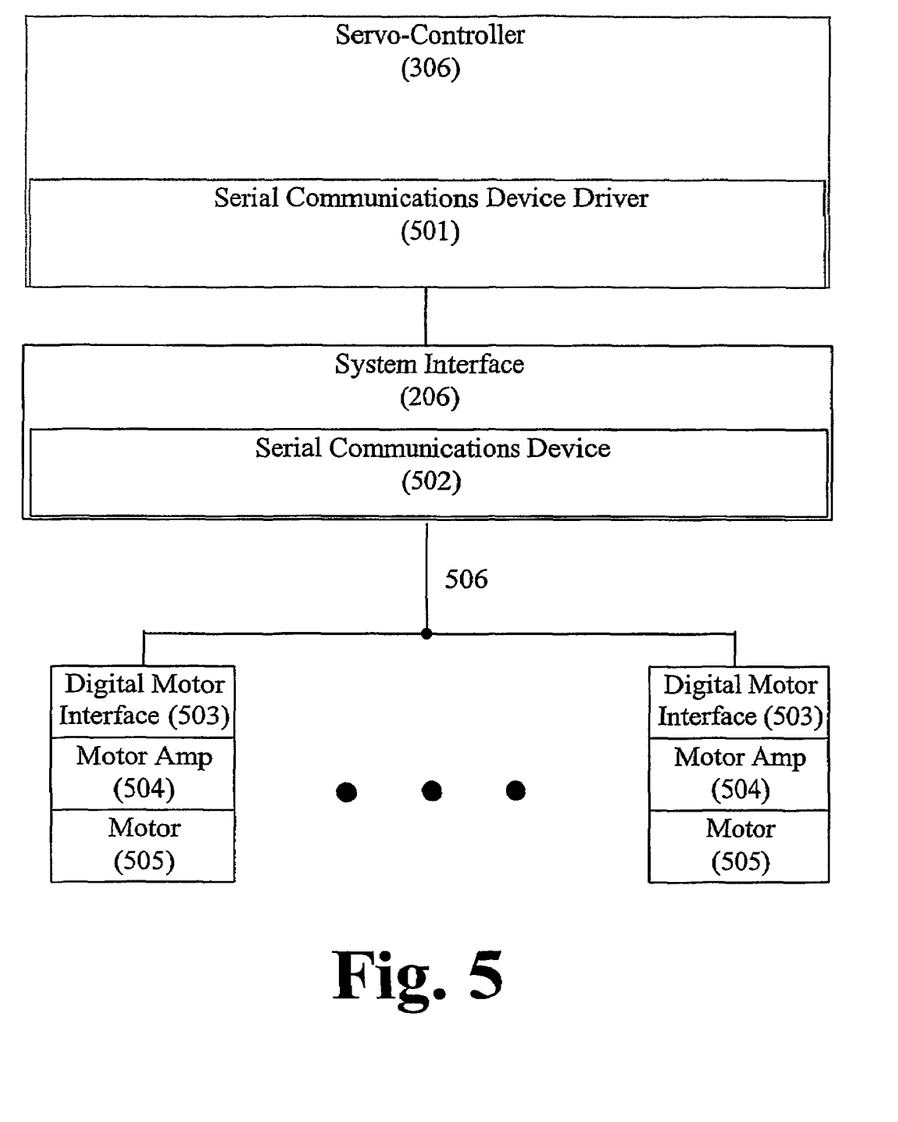
FIG. 5 is a more detailed block diagram of the servo-controller object and system interface shown in FIG. 2, according to a second embodiment.

FIG. 5 illustrates a second embodiment of the present invention in which digital motors are used to drive the parts of the machine tool to move the machine head through the desired tool path. The servo-controller 306 may include a serial communications device driver 501. In this embodiment, the system interface (206) includes a serial communications device (502) that communicates over a high-speed data network (506) with the digital motor interface (503) of each motor unit. Control signals specifying torque set points are received by the digital motor interface (503) and converted into an analog signal which is then amplified with a motor amp (504) and used to drive the respective motors (505) as necessary to move the machine tool through the specified tool paths. As above, sensor complete the servo-loop which can be entirely software driven.

As described herein, the Direct Machining method and system of the present invention provide a wealth of advantages over traditional machining techniques. Direct Machining eliminates many of the problems associated with the current design-to-manufacturer processes because of the use of the true design geometry instead of just the discrete point data used in CL files and M&G code. Because machining is based on the original design geometry, there is no geometric information loss or approximation.

Additionally, because there are no new files created, there is no problem with obsolete CL and M&G files residing on the system which might inadvertently be used to incorrectly machine a part. Changes to the design file are directly reflected in the operation of the controlled machine tool. There are also indirect advantages associated with direct machining and having shop floor access to the original model. While many machining centers are capable of doing in-process inspection, with the CAD model resident in the controller (200) this inspection can be done using a touch probe and evaluated against the model itself as opposed to an extrapolation from cutter location points in the M&G file. Additionally, the controller (200) could be required to check the design file out from a Product Data Management (PDM) system to which the controller (200) is networked, further eliminating the possibility of machining obsolete parts.

An example, of the method of creating tool paths from the CAD file (309) and generating the Motion Object to incorporate that tool path data will now be described in more detail. In general, there are two types of machining: roughing and finishing. Roughing removes the majority of the material from the stock, while finishing tries to match the surface of the stock to an exact surface specified for the part. In this example, we will only concern ourselves with finishing tool paths in milling operations.

Tool paths represent the path that the center of the tip of the tool head of the machine tool follows, not the path of the point of tangency between the surface of the part and the tool. In some simple operations, like face milling, the tool tip is the tangent point, so the tool paths lie directly on the machined surface. In slightly more complex machining, such as machining pockets, the side of the end mill does the cutting. In this case, the tool paths lie on a surface offset from the machined surface at a distance of the radius of the tool.

Things are a little more complicated when machining free-form surfaces because such surfaces are often machined using ball end mills that have a spherical tip with the same radius as the tool. Tool tip locations are calculated for ball end mills using the following equation:

$$P(s,t)=Q(s,t)+RN(s,t)-[0,0,R]$$

where R is the radius of the ball end mill, Q(s,t) are the tangency points and N(s,t) the surface normals at each tangency point Q(s,t). If the spherical tip of the tool is tangent to the part surface, the center of the tool tip will lie on a surface that is offset from the part surface by the radius of the tool. If the tool is aligned vertically, as it is in 3-axis machining, then the tool tip is exactly one radius lower in the Z direction than the center of the spherical portion of the tool. In order to create the surface that the tool tip follows, a surface is offset from the machined surface and then lowered along the Z-axis by the radius of the ball end mill. This surface is then intersected with vertical planes to define actual tool paths.

In the C++ environment described above, all Motion Objects passed to the Motion Controller (305) are actually members of classes derived from the Motion Object (302). There can be many different derived classes from the Motion Object (302) for specific control purposes. The elegance of this arrangement is that the Motion Controller (305) never knows what type of Motion Object is passed to it. As long as the passed object has the interface of the Motion Object (302), the Motion Controller (305) doesn't need any additional information. This means that new Motion Objects can be developed and integrated in the CAD Interpreter (301) and the Motion Controller (305) can understand them without being updated itself.

As noted above, the motion object passed to the Motion Controller (305) will typically specify tool paths in Cartesian coordinates. This is a convenient way to specify motion that is to follow a prescribed path like that in machining operations. Consequently, a specific child class of the Motion Object (302) may be called the Basic Cartesian Motion Object class. For simplicity, all references to a Motion Object will hereafter be understood to refer to a Basic Cartesian Motion Object.

Figure 6:
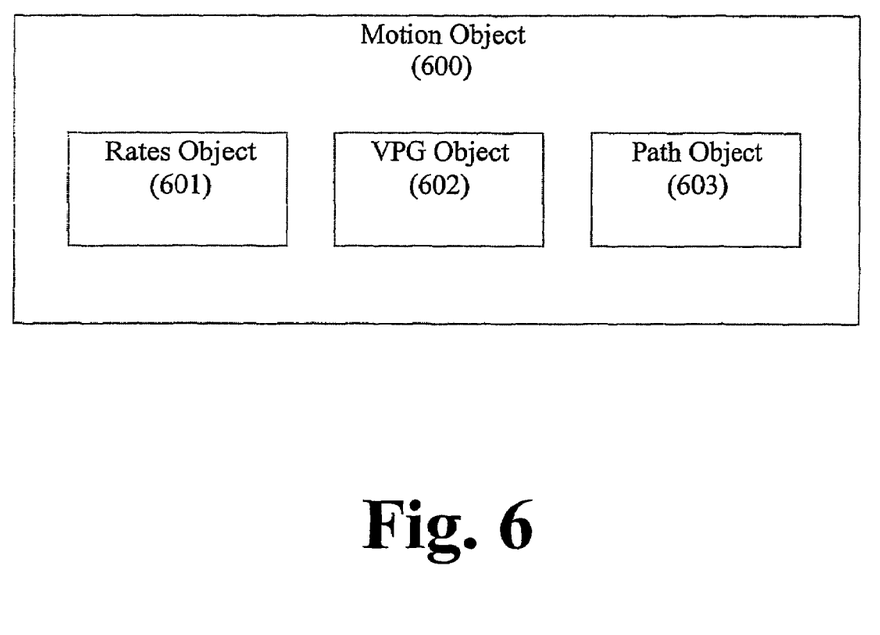
FIG. 6 is a block diagram of the motion object generated by the CAD Interpreter of FIG. 3.

As illustrated in FIG. 6, these derived Motion Objects (600) preferably contain three members of special classes: a Rates Object (601), a Velocity Profile Generator ("VPG") Object (602), and a Path Object (603). The Rates Object (601) determines the feeds and speeds to be used, the VPG Object (602) controls the velocity transitions and the Path Object (603) contains all the information about the geometry of the path.

Just like the Motion Object (600), the Path Object (603) is also a base class from which specific paths are derived. Path Objects (603) store the geometry as a parametric equation. With these parametric equations, the Path Object (603) can tell the Motion Object (600) the desired position and orientation of the tool at any point along the curve. The Motion Object (600) combines this geometry with the information contained in the Rates Object (601) and the VPG Object (602), and calculates position and orientation at any time. Because the Path Objects (603) are always members of derived classes, the Motion Object doesn't need a specification of the type of Path Object that it is working with.

This mode of transferring geometry to the controller is very different from what is currently being done with M&G code, and has some significant implications. In the prior art system of FIG. 1, the machine tool controller (104) is given the minimum amount of geometrical information needed to define the tool path. The controller (104) then uses this geometry to interpolate a continuous motion path. For example, two end points define a line segment, and two end points, a center point, and a direction of rotation define a helix or arc.

Using the polymorphic C++ objects of the present invention to pass geometrical information does not require the Motion Controller (305) to know what type of path it has received. Further, the path is only known as a general curve that can tell the Motion Controller (305) its geometry to any level of detail necessary.

The use of polymorphic C++ objects as described herein involves a much greater amount of data processing and storage than has been required in previous systems such as illustrated in FIG. 1. This is not a significant problem, however, because modem controllers are fast enough and have enough memory to handle such an increase in data flow. One significant advantage of Direct Machining is that the controller receives exactly the amount of information that it needs. Eventually, all curves must be broken down into small, discrete segments when the I/O commands are sent to the drive motors. Conventionally, the curve is discretized by the CAM program when exporting an APT file. In Direct Machining, the Motion Controller discretizes the curve. This allows the controller to machine at its best tolerance all the time.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for interfacing a control system with a machine comprising: a first processor executing a design application that generates motion path data without machine control language conversion; a second processor, that interfaces with said first processor, said second processor executing motion control software that accesses said motion path data from said design application on said first processor, and the second processor executing servo-control software, wherein said motion control software and said servo-control software controls the machine in accordance with said motion path data, and said motion path data comprises objects which are adaptable to allow the control system to interface with a different machine, wherein the first processor and the second processor are part of the same computer.

2. The system of claim 1, wherein the machine is a machine tool for machining stock material according to design specifications.

3. The system of claim 1, wherein said design application is a computer aided-design/computer-aided-manufacturing software package.

4. The system of claim 1, wherein motion control software extracts said motion path data from said design application using an Application Program Interface of said design application.

5. The system of claim 1, wherein said design application passes said motion path data to said motion control software through an Application Program Interface of said motion control software.

6. The system of claim 1, wherein said system further comprises a display device and user input device interfaced with said first processor for generating, reviewing or editing said motion path, data with said design application.

7. The system of claim 1, wherein: said design application produces a motion object containing said motion path data, said motion path data defining motion paths along which a tool head of the machine is to be moved; and said design application passes said motion object to said motion control software on said second processor.

8. The system of claim 7, wherein said motion object comprises: a rates object that determines feed rates and speed rates for control of members of the machine; a velocity profile generator object for controlling velocity transitions in said motion paths; and a path object containing information defining each motion path.

9. The system of claim 1, wherein: said motion control software accesses motion path data through said design application, said motion path data defining motion paths along which a tool head of the machine is to be moved; and said motion control software produces a motion object containing said motion path data.

10. The system of claim 1, wherein said motion path data output by said design application specifies tool paths in a Cartesian coordinate system and said motion control software translates the tool paths into servo control signals for driving motors of the machine.

11. The system of claim 1, wherein: said motion control software comprises a motion controller application and a servo controller application; said motion controller application maps said motion path data into a coordinate system defined by the machine; and said servo controller application generates controls signals for transmission to servos of the servo-driven machine in accordance with said mapped motion path data from said motion controller application.

12. The system of claim 1, wherein said first processor and said second processor interface within a multi-processor computer workstation.

13. A method of operating a machine tool for machining a supply of stock material according to a specified design, the method comprising extracting tool path data from a design within a computer-aided-design/computer-aided manufacture software package through an Application Program Interface of said computer-aided-design/computer-aided-manufacturing software package, wherein the design application operates on a first processor and generates the tool path data without machine control language conversion, wherein the tool path data is extracted by a second processor that executes motion control software, the second processor also executing servo-control software, wherein the tool path data comprises objects which are adaptable to allow the control system to interface with a different machine, wherein the first processor and the second processor are part of the same computer.

14. The method of claim 13, further comprising controlling said machine tool in accordance with said tool path data such that specified elements of said machine tool are moved along tool paths defined by said tool path data extracted from said design.

15. The method of claim 13, further comprising: modifying said design with said computer-aided-design/computer-aided-manufacturing software package; extracting modified tool path data from said modified design; and controlling said machine tool in accordance with said modified tool path data such that specified members of said machine tool are moved along tool paths defined by said modified tool path data extracted from said modified design.

16. A method of interfacing a control system with a machine comprising: executing a design application that generates motion path data for said machine, the motion path data being generated without machine control language conversion; executing motion control software that receives said motion path data in a same form as output by said design application; and controlling the servo-driven machine with said motion control software in accordance with said motion path data from said design application, further comprising executing said design application and said motion control software on different processors that are part of the same computer, wherein a second processor executes servo-control software.

17. The method of claim 16, further comprising machining stock material with the machine, which is a machine tool, to make a product defined by said motion path data.

18. The method of claim 16, wherein said design application is a computer-aided-design/computer-aided-manufacturing software package.

19. The method of claim 16, further comprising: using a computer-aided-design software package to generate a file in which tool paths are specified rather than end product geometry; and generating said motion path data from said file with said design application.

20. The method of claim 16, further comprising editing said motion path data with said design application.

21. The method of claim 16, further comprising reviewing said motion path data with said design application.

22. The method of claim 16, further comprising: generating, with said design application, a motion object containing said motion path data, said motion path data defining motion paths along which members of the machine are to be moved; and passing said motion object to said motion control software.

23. The method of claim 16, wherein said motion path data output by said design application specifies tool paths in a Cartesian coordinate system and said method further comprises translating said tool paths into servo control signals for driving motors of the servo-driven machine.

24. A system for interfacing a control system with a machine comprising: means for generating motion path data for the machine, the motion path data being generated without machine control language conversion; means for executing motion control software that receives said motion path data in a same form as output by said means for generating said motion path data; and means for controlling the machine in accordance with said motion path data, wherein the means for generating motion and the means for executing motion control software are part of the same computer, further comprising means for executing servo control software.

25. The system of claim 24, wherein the machine comprises means for machining stock material to make a product defined by said motion path data.

26. The system of claim 24, wherein said means for generating motion path data comprises a computer-aided-design/computer-aided-manufacturing software package.

27. The system of claim 24, further comprising means for reviewing and editing said motion path data.

28. A system for interfacing a control system with a machine comprising: a first processor executing a design application that generates motion path data without machine control language conversion; a second processor, that interfaces with said first processor, said second processor executing motion control software that receives said motion path data from said design application on said first processor passed through an Application Program Interface of said motion control software, wherein the second processor also executes servo control software; and wherein said motion control software controls the machine in accordance with said motion path data, wherein the first processor and the second processor are part of the same computer.

29. The system of claim 28, wherein the machine is a machine tool for machining stock material according to design specifications.

30. The system of claim 28, wherein said design application is a computer aided-design/computer-aided-manufacturing software package.

31. The system of claim 28, wherein said system further comprises a display device and user input device interfaced with said first processor for generating, reviewing or editing said motion path data with said design application.

32. The system of claim 28, wherein: said design application produces a motion object containing said motion path data, said motion path data defining motion paths along which a tool head of the machine is to be moved; and said design application passes said motion object to said motion control software.

33. The system of claim 32, wherein said motion object comprises: a rates object that determines feed rates and speed rates for control of members of the servo-driven machine; a velocity profile generator object for controlling velocity transitions in said motion paths; and a path object containing information defining each motion path.

34. The system of claim 28, wherein said motion path data output by said design application specifies tool paths in a Cartesian coordinate system and said motion control software translates the tool paths into servo control signals for driving motors of the machine.

35. The system of claim 28, wherein: said motion control software comprises a motion controller application and a servo controller application; said motion controller application maps said motion path data into a coordinate system defined by the machine; and said servo controller application generates controls signals for transmission to servos of the machine in accordance with said motion path data from said motion controller application.

36. The system of claim 28, wherein said first processor and said second processor interface within a multi-processor computer workstation.

37. A system for interfacing a control system with a machine comprising: a first processor executing a design application that produces a motion object containing motion path data that has been generated without machine control language conversion, said motion path data defining motion paths along which a tool head of the machine is to be moved; a second processor, that interfaces with said first processor, said second processor executing motion control software that receives said motion object from said design application on said first processor, the second processor also executing servo-control software; and wherein said motion control software controls the machine in accordance with said motion path data, wherein the first processor and the second processor are part of the same computer.

38. The system of claim 37, wherein the machine is a machine tool for machining stock material according to design specifications.

39. The system of claim 37, wherein said design application is a computer aided-design/computer-aided-manufacturing software package.

40. The system of claim 37, wherein said system further comprises a display device and user input device interfaced with said first processor for generating, reviewing or editing said motion path data with said design application.

41. The system of claim 37, wherein said motion object comprises: a rates object that determines feed rates and speed rates for control of members of the servo-driven machine; a velocity profile generator object for controlling velocity transitions in said motion paths; and a path object containing information defining each motion path.

42. The system of claim 37, wherein said motion path data output by said design application specifies tool paths in a Cartesian coordinate system and said motion control software translates the tool paths into servo control signals for driving motors of the machine.

43. The system of claim 37, wherein: said motion control software comprises a motion controller application and a servo controller application; said motion controller application maps said motion path data into a coordinate system defined by the servo-driven machine; and said servo controller application generates controls signals for transmission to servos of the servo-driven machine in accordance with said motion path data from said motion controller application.

44. The system of claim 37, wherein said first processor and said second processor interface within a multi-processor computer workstation.

* * * * *